United States Patent [19]

Takarabe et al.

[11] Patent Number: 5,011,209
[45] Date of Patent: Apr. 30, 1991

[54] ARRANGEMENT FOR MOUNTING SEAT SLIDING DEVICE ON VEHICLE FLOOR

[75] Inventors: Isamu Takarabe; Mikio Honma; Hatsuo Hayakawa, all of Yokohama, Japan

[73] Assignee: Ohi Seisakusho Co., Ltd., Yokohama, Japan

[21] Appl. No.: 384,703

[22] Filed: Jul. 25, 1989

[30] Foreign Application Priority Data

Jul. 26, 1988 [JP] Japan .................. 63-184496

[51] Int. Cl.$^5$ .............................................. B60N 1/08
[52] U.S. Cl. ..................................... 296/65.1; 248/430
[58] Field of Search ................. 296/65.1; 248/429, 430

[56] References Cited

U.S. PATENT DOCUMENTS

| 1,306,498 | 6/1919 | Moses | 296/65.1 |
| 1,716,316 | 6/1929 | Lanning | 296/65.1 |
| 2,266,200 | 12/1941 | Hedley | 296/65.1 |
| 4,157,797 | 6/1979 | Fox | 296/65.1 X |
| 4,717,194 | 1/1988 | Ota et al. | 296/65.1 |
| 4,756,503 | 7/1988 | Fujita | 296/65.1 X |
| 4,779,917 | 10/1988 | Campbell et al. | 296/65.1 |
| 4,821,991 | 4/1989 | Aihara et al. | 296/65.1 X |

FOREIGN PATENT DOCUMENTS 1384318  3/1988  U.S.S.R. ............................. 296/65.1

Primary Examiner—Margaret A. Focarino
Assistant Examiner—Joseph D. Pape
Attorney, Agent, or Firm—Foley & Lardner

[57] ABSTRACT

Disclosed herein is an arrangement in a motor vehicle having a floor and a seat. The arrangement comprises a first structure which defines a groove by the vehicle floor; a seat sliding device which comprises two units each including a stationary rail, a movable rail slidably interlocked with the stationary rail and rollers and balls for smoothing the movement of the movable rail relative to the stationary rail, one unit of the seat sliding device being tightly received in the groove having a given part of the movable rail projected upward from the groove; a rug spread on the vehicle floor in a manner to cover the groove, the rub having an elongate slit through which the given part of the movable rail is projected upward; and a second structure for connecting the given part to the seat.

13 Claims, 3 Drawing Sheets

ARRANGEMENT FOR MOUNTING SEAT SLIDING DEVICE ON VEHICLE FLOOR

BACKGROUND OF THE INVENTION

1. Field of the Invention

The present invention relates in general to seat sliding devices of a motor vehicle, and more particularly to an arrangement for mounting the seat sliding device on the vehicle floor.

2. Description of the Prior Art

A typical seat sliding device hitherto used for motor vehicles comprises generally a pair of parallel stationary rails, a pair of parallel movable rails slidably interlocked with the stationary rails and mounting thereon a seat, a position lock device for locking the movable rails at a desired fore-and-aft position relative to the stationary rails and a control handle mounted beneath the seat for manually controlling the position lock device. Usually, a seatbelt anchor is fixed to a rear end of either the seat or one of the movable rails for anchoring a seatbelt which is associated with the seat.

The stationary rails are fixedly disposed on a vehicle floor, so that the seat along with the movable rails can move forward or rearward to a desired locked position relative to the stationary rails.

However, due to its inherent construction, the arrangement for mounting such seat sliding device on the vehicle floor, which has been hitherto employed, shows the following undesired phenomenon particularly when the seat assumes its rearmost locked position.

That is, when the seat assumes the rearmost locked position, the movable rails take their rearmost positions having their rear ends projected by a certain degree beyond the rear ends of the stationary rails. Thus, if, under this condition, the vehicle is subjected to a sudden stop or vehicle collision, the rear end portions of the movable rails tend to rise separating from the stationary rails due to a marked angular moment suddenly applied thereto. Of course, the separation of the movable rails from the stationary rails brings about a dangerous separation of the seat from the vehicle floor.

One of measures for eliminating this drawback is to use stationary rails which are longer than the movable rails. According to this measure, the rear ends of the movable rails can be still placed on the stationary rails keeping the interlocked engagement with the stationary rails even when the movable rails assume their rearmost positions.

However, this measure brings about another problem. That is, when the seat is moved forward from the rearmost position, the rear portions of the stationary rails become exposed to a rear seat passenger's foot space. The exposure of the stationary rails not only lowers the external appearance of the seat assembly on the vehicle floor but also interferes with the ingress and egress of the rear seat passengers.

SUMMARY OF THE INVENTION

It is therefore an essential object of the present invention to provide an arrangement for mounting a seat sliding device on a vehicle floor, which arrangement is free of the above-mentioned drawbacks.

According to a first aspect of the present invention, there is provided an arrangement for mounting a seat sliding device on a vehicle floor, in which, even when the seat is moved to its rearmost or foremost position, the stationary rails are prevented from being exposed to the vehicle cabin space.

According to a second aspect of the present invention, there is provided an arrangement for mounting a seat sliding device on a vehicle floor, in which, even when the seat is moved to its rearmost or foremost position, the entire of the movable rails keeps the mutually interlocked engagement with the stationary rails.

According to a third aspect of the present invention, there is provided a seat sliding device which is equipped at a position above the vehicle floor with a position lock device.

According to the present invention, there is provided, in a motor vehicle having a floor and a seat, an arrangement which comprises first means defining a groove by the vehicle floor; a seat sliding device which comprises two units each including a stationary rail, a movable rail slidably interlocked with the stationary rail and movement smoothing means for smoothing the movement of the movable rail relative to the stationary rail, one unit of the seat sliding device being tightly received in the groove having a given part of the movable rail projected upward from the groove; a rug spread on the vehicle floor in a manner to cover the groove, the rug having an elongate slit through which the given part of the movable rail is projected upward; and second means connecting the given part to the seat.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Referring to the accompanying drawings, there is shown a seat sliding device 3 which is mounted on a vehicle floor 1 in an arrangement as is suggested by the present invention.

Figure 1:
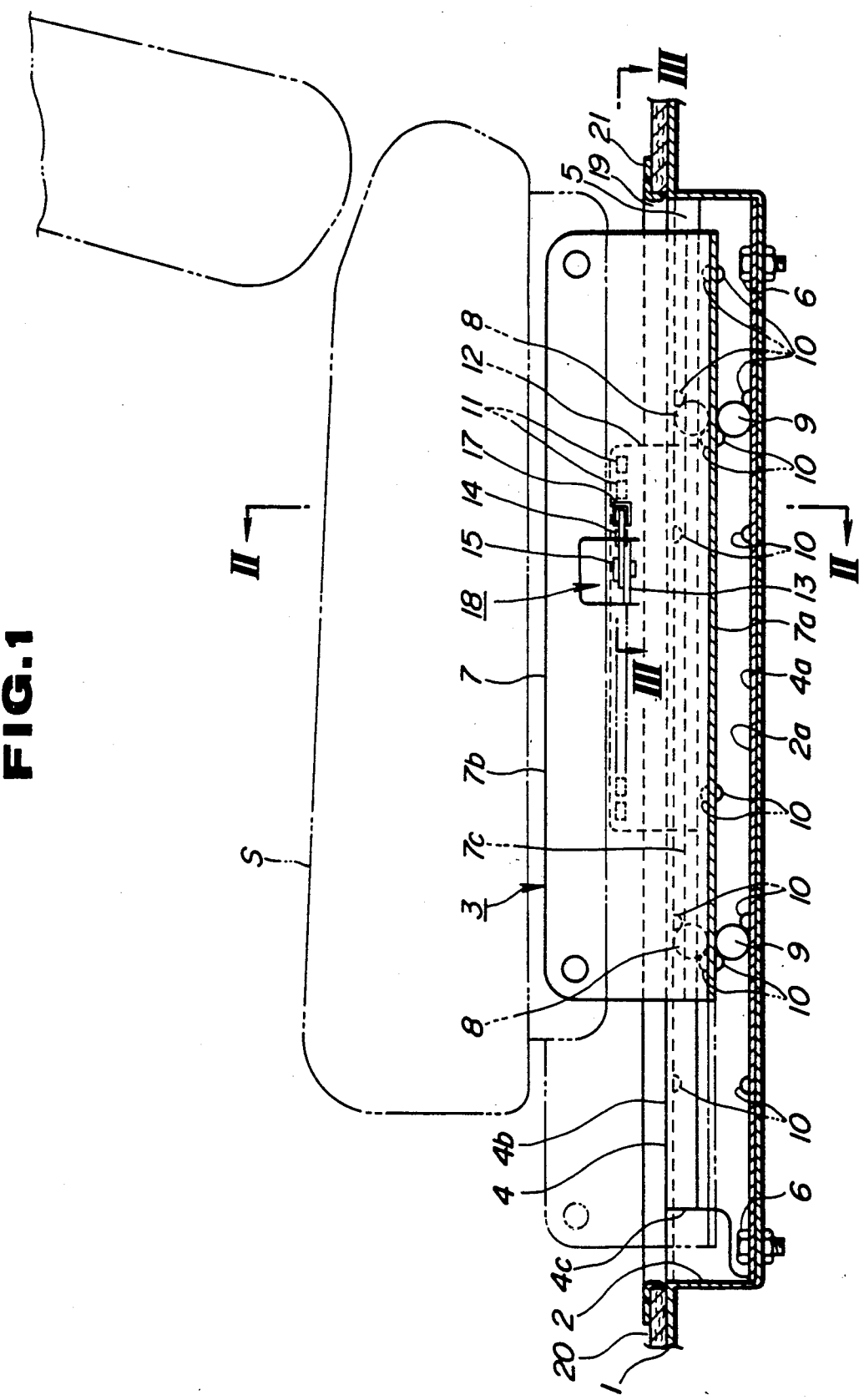
FIG. 1 is a vertical sectional view of a seat sliding device which is mounted on a vehicle floor in such an arrangement as is suggested by the present invention.

It is to be noted that FIG. 1 shows a condition wherein an automotive front seat "S" assumes a rear position.

The seat sliding device 3 for the seat "S" comprises substantially two identical units each including a stationary rail, a movable rail, rollers and balls as will be described in detail hereinafter.

Figure 4:
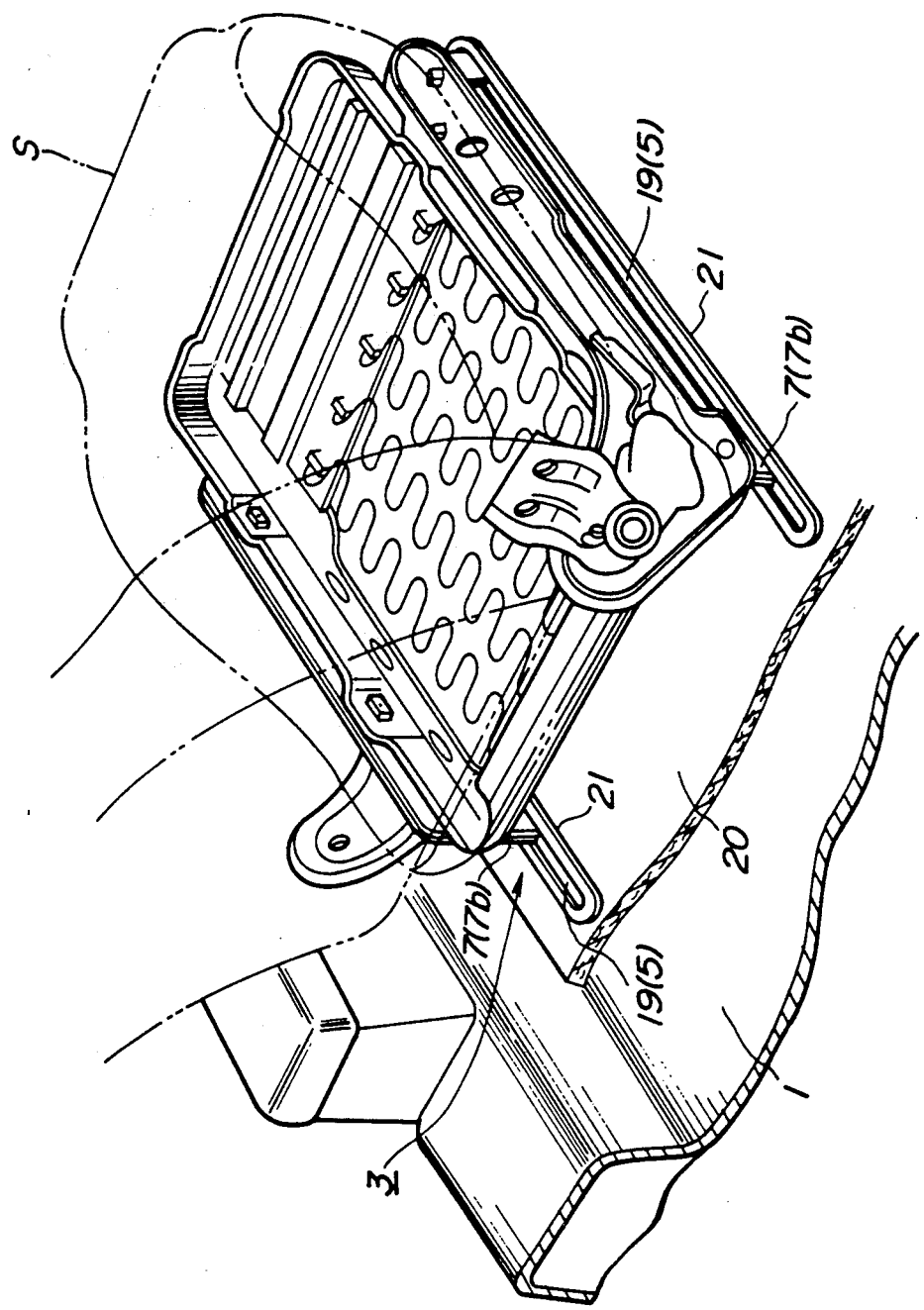
FIG. 4 is a perspective view of the seat sliding device taken from the back side of the seat.

As is understood from FIG. 4, the vehicle floor 1 on which the seat sliding device is mounted is formed with a pair of parallel grooves 2 (FIG. 2) which extend in a fore-and-aft direction with respect to the associated motor vehicle.

Figure 2:
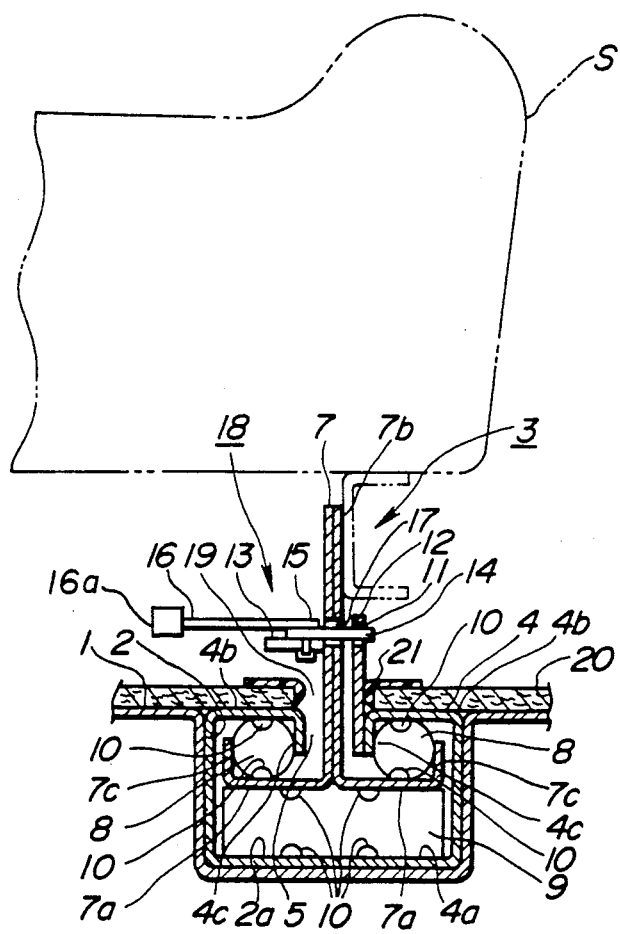
FIG. 2 is a sectional view taken along the line II—II of FIG. 1.

As is seen from FIGS. 1 and 2, each groove 2 has a rectangular cross section and receives therein almost all of the corresponding unit of the seat sliding device 3.

As is best seen from FIG. 2, each unit of the seat sliding device 3 comprises a stationary rail 4 which is of a hollow member having a generally rectangular cross section. The stationary rail 4 has at its upper flat wall 4b a longitudinally extending slit 5. The rail 4 is fitted in the groove 2 of the vehicle floor 1 in such a manner that the slit-formed upper wall thereof 4b is substantially flush with the major portion of the vehicle floor 1. The length of the rail 4 is substantially the same as or somewhat smaller than that of the groove 2.

As is seen from FIG. 1, front and rear portions of the stationary rail 4 are secured to a bottom portion 2a of the groove 2 by means of bolts 6 and nuts.

As is seen from FIG. 2, a movable rail 7 having a reversed T-shaped cross section is operatively engaged with the stationary rail 4 in a manner to achieve a so-called "interlocked engagement" therebetween. The movable rail 7 is comprised of two identical metal parts of generally L-shaped cross section which are combined in back-to-back fashion allowing the entirety of the movable rail to include an enlarged flat head portion 7a and a vertical wall portion 7b. As shown, the enlarged flat head portion 7a is received in the hollow stationary rail 4 having the vertical wall portion 7b projected upward throught the slit 5 of the stationary rail 4.

Two rollers 9 are disposed between a flat bottom 4a of the stationary rail 4 and the enlarged flat head portion 7a of the movable rail 7, and two pairs of balls 8 are disposed between the enlarged flat head portion 7a of the movable rail 7 and the slit-formed upper wall 4b of the stationary rail 4. With provision of these rollers 9 and balls 8, the forward and rearward movement of the movable rail 7 relative to the stationary rail 4 is smoothly achieved. For holding each ball 8 in place, the upper wall 4b of the stationary rail 4 has downward flanges 4c at opposed sides of the slit 5 and the enlarged flat head portion 7a of the movable rail 7 has upward flanges 7c at opposed outside portions.

As is seen from FIGS. 1 and 2, a plurality of paired stoppers 10 are formed on each of the stationary and movable rails 4 and 7, to which the rollers 9 and balls 8 are contactable to restrict the fore-and-aft movement of the movable rail 7 relative to the stationary rail 4.

As is best seen from FIG. 2, the vertical wall portion 7b of the movable rail 7 is secured at its upper end to a seat frame (no numeral) of the seat "S". With this, the seat "S" moves together with the movable rails 7.

As will be seen from FIG. 1, the movable rail 7 is shorter than the stationary rail 4. In other words, the stationary and movable rails 4 and 7 are so sized and arranged that even when the seat "S" assumes its foremost or rearmost position, the entirety of the movable rail 7 can keep in interlocked engagement with the stationary rail 4.

As is seen from FIGS. 1 and 2, a rectangular lock plate 12 is secured, by welding or the like, at its lower end to the outside one of the downward flanges 4c of the stationary rail 4. The lock plate 12 is formed with a plurality of lock holes 11 which are aligned along the axis of the stationary rail 4.

Figure 3:
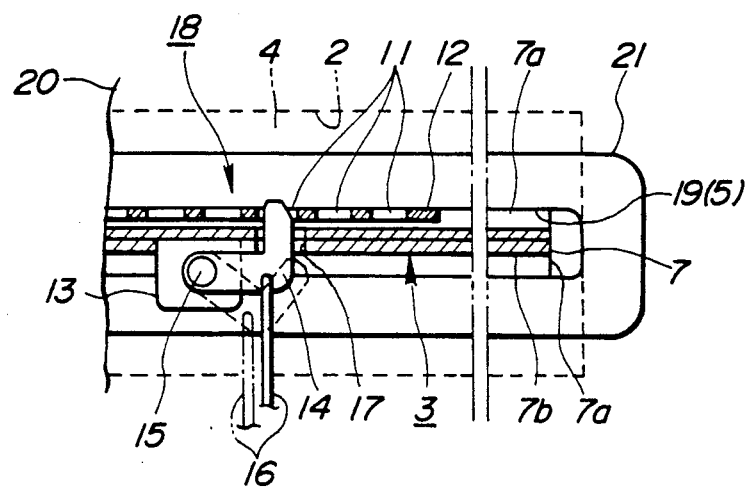
FIG. 3 is a sectional view taken along the line III—III of FIG. 1.

The movable rail 7 has at the vertical wall portion 7b thereof a horizontal bracket 13 projected away from the lock plate 12. Near the bracket 13, there is formed an aperture 17 in the vertical wall portion 7b. As is seen from FIG. 3, a generally L-shaped latch pawl 14 is pivotally connected at its base portion to the bracket 13 through a vertical pin 15. Under a given condition, the latch pawl 14 is projected into the aperture 17 to achieve a latching engagement with one of the lock holes 11 of the lock plate 12. Under this condition, the movable rail 7 is locked to the stationary rail 4 thereby locking the seat "S" at a certain fore-and-aft position relative to the vehicle floor 1. A control rod 16 is pivotally connected to the latch pawl 14, which leads to a known control handle (not shown) which is operatively mounted beneath the seat "S". By a suitable biasing means 16a connected to the control rod 16, the latch pawl 14 is constantly biased in a counterclockwise direction in FIG. 3, that is, in a direction to achieve the latching engagement with the lock holes 11. When the control handle is manipulated, the control rod 16 pulls the latch pawl 14 against the force of the biasing means to cancel the latching engagement between the latch pawl 14 and the lock holes 11. Thus, with the control handle kept manipulated, the seat "S" can move to a desired fore-and-aft position freely.

Thus, the lock plate 12, the latch pawl 14 and the control rod 16 constitute an essential part of a position locking device 18 which selectively achieves and cancels the locked engagement between the movable and stationary rails 7 and 4. The stationary rail 4, the movable rail 7 and the position locking device 18 constitute an essential part of the seat sliding device 3.

As is seen from FIG. 2, a rug 20 is spread on the vehicle floor 1, which has a slit 19 at a portion facing the slit 5 of the stationary rail 4 for having the vertical wall portion 7b of the movable rail 7 passed therethrough.

The slit 19 of the rug 20 is hemmed by an elongate plastic edging frame 21. If desired, the frame 21 may be fixed to the stationary rail 4 by screws, an adhesive member or the like.

For mounting the seat sliding device 3 to the vehicle floor 1, the following steps are preferably employed.

First, each unit of the seat sliding device 3 is put into the groove 2 of the vehicle floor 1 and secured to the same by means of the bolts 6 and nuts. Then, the rug 20 is spread on the vehicle floor 1 making the slit 19 receive therethrough the vertical wall portion 7b of the movable rail 7. Then, the plastic edging frame 21 is expanded to pass over the position locking device 18 and fixed to the slit 19 of the rug 20 in a snap action manner. Thereafter, the seat "S" is fixed to the upwardly exposed part of the vertical wall portion 7b of the movable rail 7.

In the following, advantages of the present invention will be described.

First, since substantially all parts of the seat sliding device 3 are concealed by the rug 20, unsightly parts of the device 3 are not exposed to the vehicle cabin space. This improves the view the seat assembly on the vehicle floor 1.

Second, since substantially all parts of the seat sliding device 3 are received in the grooves 2 of the vehicle floor 1, the rear seat passenger's foot space is not affected by the device 3.

Third, because the seat sliding device 3 is concealed by the rug 20, the usage of stationary rails longer than the movable rails is available without the drawback encountered in the aforementioned prior art. That is, by using the longer stationary rails, the entirety of the movable rails achieve interlocked engagement with the stationary rails; irrespective of positions which the seat "S" assumes. This matter assures an increased resistance of the stationary and movable rails 4 and 7 against separation.

Fourth, since the position locking device 18 is positioned above the slit 19 of the rug 20, the size, more specifically, the width of the slit 19 can be very reduced. This promotes the improvement in external appearance of the seat assembly on the vehicle floor 1. In the following, modifications of the invention will be described.

Although the above-description is directed to the embodiment in which two units of the seat sliding device 3 are identical to each other, one of them may omit the position locking device 18.

If desired, the elongate edging frame 21 may be equipped with a brushy member which covers the slit 19 of the rug 20. According to this modification, the slit 5 of the stationary rail 4 is almost concealed by the brushy member.

Furthermore, in place of the slit 19, a linear cut may be formed in the rug 20. In this modification, the slit 5 of the stationary rail 4 is concealed by the rug 20 except the position where the vertical wall portion 7b of the movable rail 7 is located.

What is claimed is:

1. In a motor vehicle, a sliding seat arrangement, comprising:
    a groove in said vehicle floor;
    a seat sliding device which comprises two units, each including a stationary rail, a movable rail slidably interlocked with said stationary rail and movement smoothing means for smoothing the movement of said movable rail relative to said stationary rail, one unit of said seat sliding device being tightly received in said groove having a given part of said movable rail projecting upward from said groove;
    a rug spread on said vehicle floor in a manner to cover said groove, said rug having an elongated slit through which said given part of said movable rail is projected upward, said elongated slit extending along said groove of said floor, so that the sliding movement of said movable rail relative to said stationary rail causes said given part of the movable rail to move in and along said elongated slit; and
    second means connecting said given part to said seat, wherein the length of said stationary rail is longer than that of said movable rail.

2. An arrangement as claimed in claim 1, in which said stationary rail has an upper flat surface which is substantially flush with the vehicle floor.

3. An arrangement as claimed in claim 2, in which said upper flat surface of said stationary rail is formed with a longitudinally extending slit through which said given part of said movable rail passes.

4. An arrangement as claimed in claim 3, in which the length of said stationary rail is longer than that of said movable rail.

5. An arrangement as claimed in claim 1, in which at least one of said two units of said seat sliding device is equipped with a position locking device which is located above said rug.

6. An arrangement as claimed in claim 1, in which said movement smoothing means of said seat sliding device comprises rollers and balls which are rotatably disposed between said stationary rail and said movable rail.

7. An arrangement as claimed in claim 1, in which said stationary rail and said movable rails are so arranged that even when said movable rail assumes its foremost or rearmost position relative to said stationary rail, the entire movable rail keeping interlocked engagement with said stationary rail.

8. An arrangement as claimed in claim 7, in which said stationary rail is secured to the bottom of said groove by means of bolts and nuts.

9. An arrangement as claimed in claim 1, in which said two units of said seat sliding device are identical to each other.

10. In a motor vehicle, a sliding seat arrangement, comprising:
    a groove in said vehicle floor;
    a seat sliding device comprising two units, each including a stationary rail, a movable rail slidingly interlocked with said stationary rail and movement smoothing means for smoothing the movement of said slidable rail relative to said stationary rail, one unit of said seat sliding device being tightly received in said groove having a given part of said movable rail projecting upward from said groove;
    a rug spread on said vehicle floor in a manner to cover said groove, said rug having an elongated slit through which said given part of said movable rail projects upward;
    a second means connecting said given part to said seat; and
    a seat locking device located above said rug, said seat locking device being attached to at least one of said two units and including,
    a lock plate secured to said stationary rail and projecting upwardly through said elongated slit of said rug, said lock plate having at the upward projecting portion a plurality of lock holes aligned along the axis of said stationary rail, a latch pawl pivotally connected to said given part of the movable rail and a biasing means for biasing said latch pawl in a direction to achieve latching engagement between said latch pawl and the lock holes of said latch plate.

11. The arrangement of claim 10, in which the latch pawl is pivotally connected through a vertical pivot pin to a horizontal bracket located on said given part of said movable rail.

12. The arrangement of claim 11, in which said given part of said movable rail is formed with an aperture through which said latch pawl is projected to achieve engagement with the lock holes of the lock plate.

13. The arrangement of claim 12, in which said elongated slit of said rug is hemmed by an elongated plastic edging frame.

* * * * *